United States Patent [19]
Chen et al.

[11] Patent Number: 6,058,008
[45] Date of Patent: May 2, 2000

[54] INSERTION DEVICE FOR THE HARD DISK DRIVE OF A PORTABLE COMPUTER

[75] Inventors: Ying-Hu Chen; Po-An Lin, both of Taipei, Taiwan

[73] Assignee: Compal Electronics, Inc., Taipei, Taiwan

[21] Appl. No.: 09/059,284

[22] Filed: Apr. 14, 1998

[51] Int. Cl.$^7$ ...................................................... G06F 1/16
[52] U.S. Cl. .......................................... 361/685; 361/725
[58] Field of Search .................................. 361/685, 725; 312/223.2; 360/99.12

[56] References Cited

U.S. PATENT DOCUMENTS

| | | | |
|---|---|---|---|
| 5,563,767 | 10/1996 | Chen | 361/685 |
| 5,673,172 | 9/1997 | Hastings et al. | 361/685 |
| 5,788,211 | 8/1998 | Astier | 361/685 |

*Primary Examiner*—Leo P. Picard
*Assistant Examiner*—John D. Reed
*Attorney, Agent, or Firm*—Bacon & Thomas

[57] ABSTRACT

An insertion device for the hard disk drive of a portable computer is fixedly disposed in a base of the portable computer and includes hinged-together upper and lower covers for receiving the hard disk drive. The insertion device is secured to the base by adhesion to facilitate the procedure for assembling the insertion device to the base. The hard disk drive is inserted into the insertion device and the covers closed to secure the hard disk drive in the base. The hard disk drive can easily be taken out by pivoting the upper cover away from the lower cover and using a pulling member to remove the hard disk drive from the insertion member. The insertion device, which may be made of a relatively soft material, effectively minimizes shock forces and protects the hard disk drive from being damaged.

16 Claims, 2 Drawing Sheets

INSERTION DEVICE FOR THE HARD DISK DRIVE OF A PORTABLE COMPUTER

BACKGROUND OF THE INVENTION

The present invention relates to an insertion device for hard disc of portable computer, and more particularly to an insertion device capable of protecting the hard disc from shocking and reducing manufacturing cost for portable computer.

Conventionally, the portable computer base is assembled with the hard disc in such a manner that the bottom of the hard disc is formed with multiple thread holes (generally six thread holes, three on each side) for locking. The portable computer base is also formed with multiple corresponding thread holes. When assembled, screws are screwed into the thread holes to secure the hard disc with the portable computer base. According to the above arrangement, quite a lot of screws are necessary for locking and the locking procedure must be performed manually. Therefore, the manufacturing procedure is quite troublesome and the cost is relatively high.

Furthermore, the portable computer base is made of relatively hard plastic material so that after assembled, in the case that the base suffers collision and shocking, the hard disc may be subject to greater shocking force and damage, especially during use of the portable computer.

Therefore, it is necessary to provide an improved measure for assembling the hard disc with the portable computer base, which measure is able to protect the hard disc from being damaged and facilitate the manufacturing and assembling procedure thereof.

SUMMARY OF THE INVENTION

It is a primary object of the present invention to provide an insertion device for hard disc of portable computer, which is disposed in the base of the portable computer. When assembling the hard disc with the portable computer, the hard disc is inserted into the insertion device and the connecting seat of the hard disc is electrically connected with the socket of the portable computer. Therefore, the procedure of assembling the hard disc with the portable computer is simplified.

It is a further object of the present invention to provide the above insertion device which is made of softer plastic material, whereby after the hard disc is inserted into the insertion device, in case the portable computer suffers collision and shocking, the insertion device can effectively absorb the shocking force and protect the hard disc from being damaged.

It is still a further object of the present invention to provide the above insertion device in which a pulling member is disposed, whereby a user only needs to pull up the pulling member for taking the hard disc out of the insertion device. Such operation is quite easy.

The present invention can be best understood through the following description and accompanying drawings, wherein:

DETAILED DESCRIPTION OF THE PREFERRED EMBODIMENT

Figure 1:
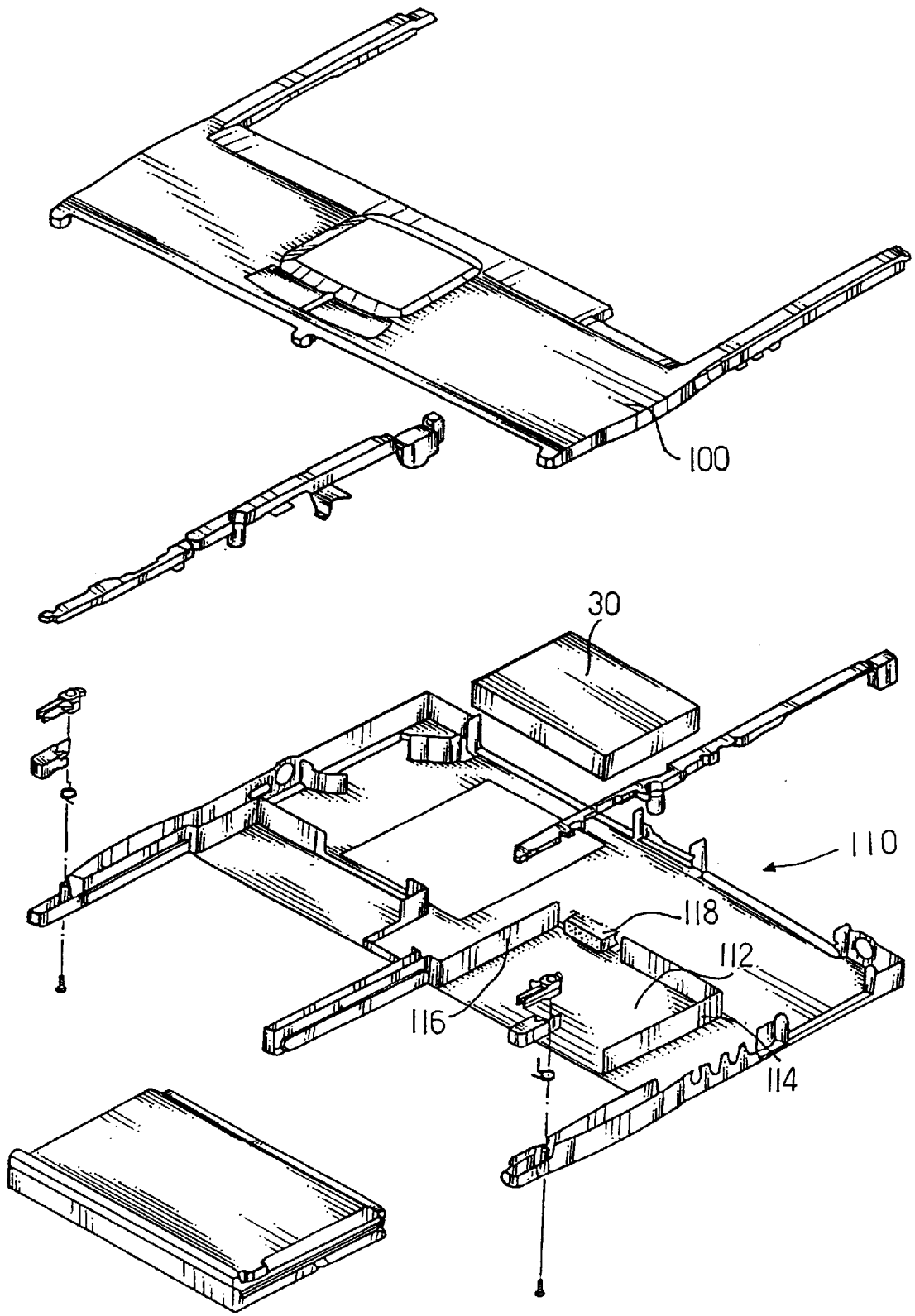
FIG. 1 is a perspective exploded view of a part of the portable computer base of the present invention.

Please refer to FIG. 1. The portable computer base is composed of a first casing 100, a second casing 110, a keyboard (not shown) and other relevant electronic circuits and mechanical components (not shown). The base is connected with a display (not shown) to form the portable computer.

The second casing 11 is formed with a receptacle 112 for receiving an insertion device 30. In a preferred embodiment, the receptacle 112 is defined by an L-shaped plate member 114 and a straight plate member 116 fixed on the second casing 110.

The insertion device 30 can be fixedly connected with the receptacle 112 by adhesion. Such assembling procedure can be easily performed.

Figure 2:
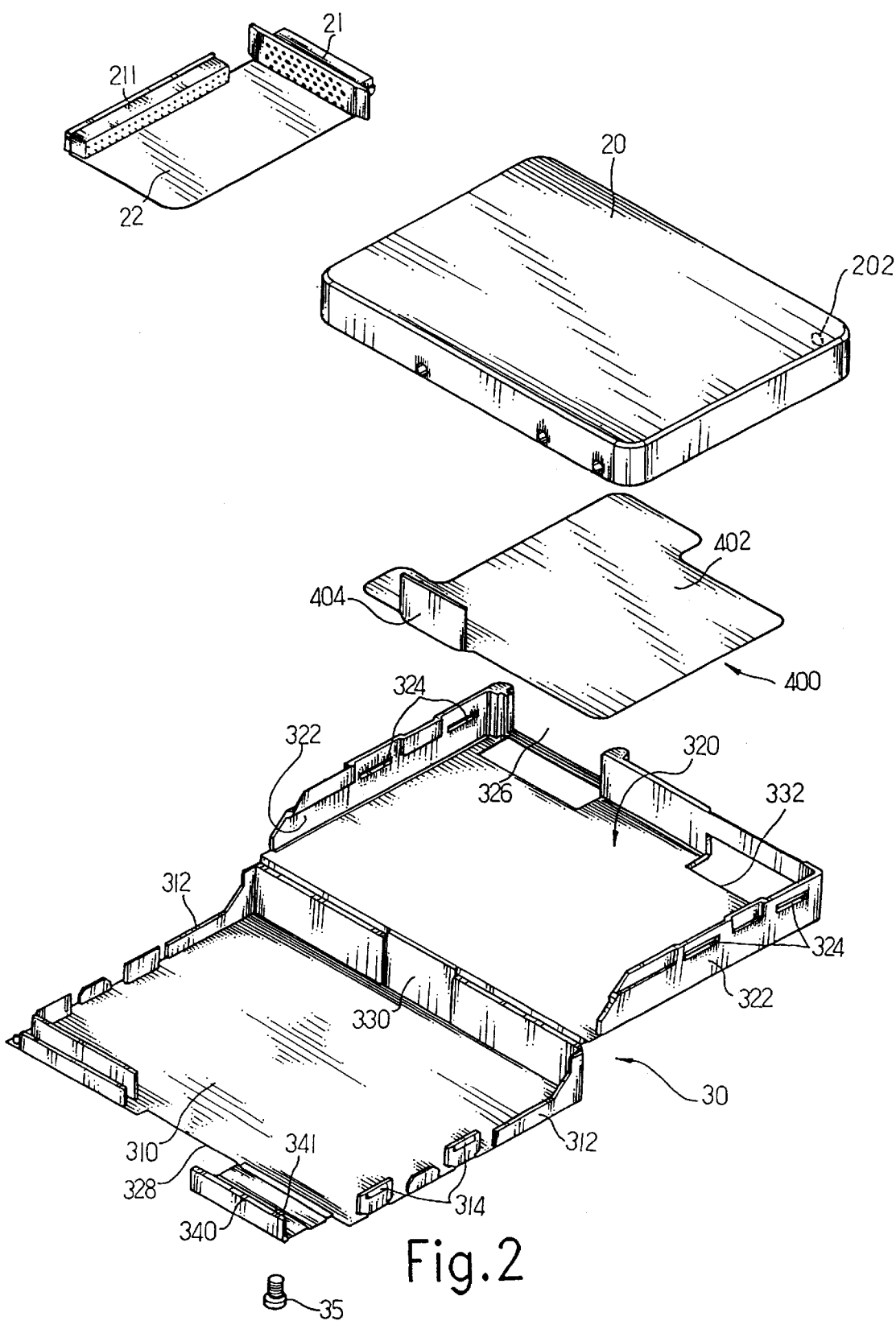
FIG. 2 is a perspective exploded view of the insertion device and the hard disc of the present invention.

Referring to FIG. 2, the insertion device 30 is composed of an upper and a lower covers 310. 320 mated with each other. The left and right lateral edges 312 of the upper cover 310 are respectively disposed with multiple first insertion structures 314. In this embodiment, the first insertion structures 314 are plate bodies formed with projections. However, alternatively, the insertion structures 314 can be plate bodies formed with slots or other structures for mating the upper and lower covers with each other. The left and right lateral edges 322 of the lower cover 320 are disposed with multiple second insertion structures 324 corresponding to the first insertion structures. The first and second insertion structures 314, 324 are engaged with each other to mate the upper and lower covers 310, 320 with each other. In this embodiment, the second insertion structures 324 are plate bodies formed with slots. However, alternatively, they can be plate bodies formed with projections or other structures for mating the upper and lower covers with each other.

Please refer to FIG. 1. Alternatively, the upper and lower covers 310, 320 can be free from any insertion structure. After assembled, the first casing 100 of the portable computer base covers the second casing 110 disposed with the insertion device 30. After the keyboard (not shown) is assembled with the base, the keyboard can right press the upper cover 310 against the lower cover 320 of the insertion device into a closed state. Therefore, without the insertion structure, the hard disc 20 can be still firmly received in the insertion device 30 and located in the base.

Referring to FIG. 2, one side of the lower cover 320 is formed with an opening 326 for a connecting seat 21 of the hard disc 20 to extend therethrough and connect with a socket 118 (as shown in FIG. 1) disposed in the base.

After the upper cover 310 is mated with the lower cover 320, the space defined therebetween has a dimension substantially equal to that of the hard disc 20. With respect to the hard disc 20 mostly widely used in portable computers, the length, width and height thereof are respectively about 100.2 cm, 70.5 cm and 13.5 cm. The space defined between the upper and lower covers 310, 320 has a length, width and depth respectively of about 100.25 cm, 70.55 cm and 13.55 cm. Therefore, the hard disc 20 can be snugly and firmly received in the insertion device 30. In addition, the lower cover 320 is mated with the upper cover 310 directly by simple connecting structure so that a user can easily cover the lower cover 320 with the upper cover 310 or pivot up the lower cover 320 from the upper cover 310.

Furthermore, a ventilation hole 330 is formed at an adjoining section between the upper and lower covers 310, 320, whereby the heat generated by the hard disc 20 can be dissipated out of the insertion device 30 through the ventilation hole 330 so as to avoid over-heating of the hard disc 20.

In order to meet the requirement of more strict using circumstance, the hard disc 20 can be firmly associated with the insertion device 30 in such a manner that the other side of the upper cover 310 is formed with a first latch section 340 formed with at least one fixing hole 341. The lower cover 320 is disposed with a second latch section 332 corresponding to the first latch section 330. The hard disc 20 is formed with a thread hole 202 corresponding to the fixing hole 341. After the first latch section 340 is latched with the second latch section 332, a screw 35 can be screwed through the fixing hole into the thread hole to firmly fix the hard disc 20 in the insertion device 30. Under such circumstance, only one single screw 35 is necessary for firmly secure the hard disc 20 in the insertion device 30. Such assembling procedure is quite simple, while achieving a good fixing effect.

In addition, in the case that the position of the actual connecting seat of the hard disc 20 is different from that of the opening 326 of the lower cover 320, an internal socket 211 can be disposed in the lower cover 320 in cooperation with the connecting seat of the hard disc 20. Then a bus-bar wire 22 is used to connect with a connecting seat 21 corresponding to the opening 326 so as to change the direction and insert with the connecting seat 118 in the portable computer base. Therefore, the application of the insertion device is not limited by the pattern of the hard disc or the direction of the connecting seat.

In addition, after the hard disc 20 is received in the insertion device 30, in order to facilitate taking of the hard disc 20 from the insertion device 30, a pulling member 400 is disposed between the hard disc 20 and the lower cover 320. The pulling member 400 is composed of a thin sheet 402 and a bent pulling plate 404 disposed beside the thin sheet 402. The pulling member 400 is disposed in the lower cover 320, whereby after the hard disc 20 is placed into the insertion device 30, the hard disc 20 will be overlaid over the pulling member 400 with the pulling plate 404 positioned on one side of the hard disc 20. Therefore, a user only needs to pull up the pulling plate 404 for taking the hard disc 20 out of the insertion device 30. Such operation is quite easy.

Moreover, the insertion device 30 and the portable computer base are two independent components so that the insertion device 30 can be made of softer material than the base. Therefore, after the hard disc 20 and the insertion device 30 are received in the base, in case the portable computer suffers collision and shocking, the insertion device 30 can effectively minimize the shocking force and Protect the hard disc 20 from being damaged.

It should be noted that the above description and accompanying drawings are only used to illustrate some embodiments of the Present invention, not intended to limit the scope thereof. Any modification of the embodiments should fall within the scope of the present invention.

What is claimed is:

1. An insertion device for the hard disk drive of a portable computer, said insertion device being fixedly disposed in a base of the portable computer, comprising:

an upper cover and a lower cover affixed on one side to the upper cover, said lower cover being pivotal away from the upper cover to permit the hard disk drive to be installed therein, and said upper cover being pivoted to a closed position relative to the lower cover to enclose and protect the hard disk drive following installation of the hard disk drive in the insertion device, said upper and lower covers each cover a substantial portion of the disk drive's upper and lower surfaces respectively the insertion device being formed with at least one opening to permit a connecting seat of the hard disc to be electrically connected with a socket of the base of the portable computer.

2. An insertion device as claimed in claim 1, wherein the insertion device is secured to the base of the portable computer by adhesion.

3. An insertion device as claimed in claim 1, wherein a pulling member is disposed between the hard disk drive and the lower cover of the insertion device, whereby a user can easily pull up the pulling member to take the hard disk drive out of the insertion device.

4. An insertion device as claimed in claim 3, wherein the pulling member includes a thin sheet and a bent pulling plate, the bent pulling plate being disposed beside the thin sheet between the hard drive and the lower cover.

5. An insertion device as claimed in claim 1, wherein the upper cover of the insertion device is disposed with at least one first insertion structure and the lower cover of the insertion device is disposed with at least one second insertion structure, whereby the first and second insertion structures are inserted with each other to mate the upper cover with the lower cover.

6. An insertion device as claimed in claim 5, wherein the first insertion structure is a plate body formed with a projection while the second insertion structure is formed with a slot corresponding to the projection, whereby the projection is inserted into the slot for mating the upper cover with the lower cover.

7. An insertion device as claimed in claim 1, wherein the socket extends through the opening to a position in the lower cover corresponding to a position of the connecting seat of the hard disk drive.

8. An insertion device as claimed in claim 1, wherein the insertion device is formed with at least one ventilation hole, whereby heat generated by the hard disk drive is dissipated out of the insertion device through the ventilation hole so as to avoid over-heating of the hard drive.

9. An insertion device as claimed in claim 1, wherein the insertion device is made of a softer material than the base of the portable computer, whereby in case the portable computer suffers a shocking force, the insertion device serves to effectively minimize the shocking force and protect the hard disk drive from being damaged.

10. An insertion device as claimed in claim 2, wherein the insertion device is made of a softer material than the base of the portable computer, whereby in case the portable computer suffers a shocking force, the insertion device serves to effectively minimize the shocking force and protect the hard disk drive from being damaged.

11. An insertion device as claimed in claim 3, wherein the insertion device is made of a softer material than the base of the portable computer, whereby in case the portable computer suffers a shocking force, the insertion device serves to effectively minimize the shocking force and protect the hard disk drive from being damaged.

12. An insertion device as claimed in claim 4, wherein the insertion device is made of a softer material than the base of the portable computer, whereby in case the portable computer suffers a shocking force, the insertion device serves to effectively minimize the shocking force and protect the hard disk drive from being damaged.

13. An insertion device as claimed in claim 5, wherein the insertion device is made of a softer material than the base of the portable computer, whereby in case the portable computer suffers a shocking force, the insertion device serves to effectively minimize the shocking force and protect the hard disk drive from being damaged.

14. An insertion device as claimed in claim 6, wherein the insertion device is made of a softer material than the base of the portable computer, whereby in case the portable computer suffers a shocking force, the insertion device serves to effectively minimize the shocking force and protect the hard disk drive from being damaged.

15. An insertion device as claimed in claim 7, wherein the insertion device is made of a softer material than the base of the portable computer, whereby in case the portable computer suffers a shocking force, the insertion device serves to effectively minimize the shocking force and protect the hard disk drive from being damaged.

16. An insertion device as claimed in claim 8, wherein the insertion device is made of a softer material than the base of the portable computer, whereby in case the portable computer suffers a shocking force, the insertion device serves to effectively minimize the shocking force and protect the hard disk drive from being damaged.

* * * * *